United States Patent
Dragone

(10) Patent No.: US 7,283,700 B2
(45) Date of Patent: Oct. 16, 2007

(54) OPTICAL ROUTER USING STATIONARY IMAGING

(76) Inventor: Corrado Pietro Dragone, 43 Windsor Dr., Little Silver, NJ (US) 07739

( * ) Notice: Subject to any disclaimer, the term of this patent is extended or adjusted under 35 U.S.C. 154(b) by 0 days.

(21) Appl. No.: 11/590,403

(22) Filed: Oct. 31, 2006

(65) Prior Publication Data

US 2007/0098322 A1    May 3, 2007

Related U.S. Application Data

(60) Provisional application No. 60/732,780, filed on Nov. 2, 2005.

(51) Int. Cl.
*G02B 6/28* (2006.01)
(52) U.S. Cl. ............... 385/24; 385/37; 385/132
(58) Field of Classification Search ............... None
See application file for complete search history.

(56) References Cited

U.S. PATENT DOCUMENTS

| | | |
|---|---|---|
| 5,136,671 A | 8/1992 | Dragone |
| 5,488,680 A | 1/1996 | Dragone |
| 5,745,618 A | 4/1998 | Li |
| 6,873,766 B2 | 3/2005 | Dragone |
| 7,003,198 B2 | 2/2006 | Doerr |
| 7,068,888 B1 | 6/2006 | Dragone |
| 2002/0172455 A1* | 11/2002 | Doerr ............... 385/24 |
| 2003/0081888 A1* | 5/2003 | Doerr ............... 385/24 |

OTHER PUBLICATIONS

Dragone, C. "Theory of Wavelength Multiplexing with Rectangular Transfer Functions", IEEE Journal of Selected Topics in Quantum Electronics, vol. 8, No. 6, Nov./Dec. 2002, pp. 1168-1178.

* cited by examiner

*Primary Examiner*—Sung Pak
*Assistant Examiner*—Chad H. Smith

(57) ABSTRACT

A planar optical filter consisting of two stages performing stationary imaging between an input waveguide and a set of output waveguides is characterized by reduced crosstalk and minimal loss variation in each passband. The input stage is a small waveguide grating router, connected to the output stage by a waveguide lens essentially covering the entire central zone of the input router. In one embodiment, the second stage includes two waveguide grating routers and the lens has two separate output apertures, respectively connected to these two routers. In this arrangement, 2N input channels applied to the input port are separated by the first grating into two interleaved sets of N channels each. The two sets are respectively transferred by the composite waveguide lens to the two output gratings which respectively separate the N channels of each set. In another embodiment, the output router only includes one output grating, and several stationary images are produced, at the same waveguide location, by different orders of the output grating.

5 Claims, 7 Drawing Sheets

Confocal Arrangement of two Periodic Arrays

Efficiency variation caused by the first stage and the composite lens of Figure 5.
The three curves show respectively the grating efficiency $\eta$ and the passbands for P=2,4.

OPTICAL ROUTER USING STATIONARY IMAGING

CROSS REFERENCES TO RELATED APPLICATIONS

This application claims the benefits under 35 U.S.C. 119(e) of U.S. Provisional Application Ser. No. 60/732,780, entitled Improved Optical Multiplexer Using Stationary Imaging, filed on Nov. 2, 2005.

FIELD OF THE INVENTION

This invention relates to optical filters, and more particularly, to wavelength routers with minimal loss and crosstalk and maximally flat passbands.

BACKGROUND OF THE INVENTION

An important function that must be provided in high quality optical networks is that of wavelength multiplexing and demultiplexing. In particular, channel adding/dropping filters are needed at each node to combine and separate different wavelength channels. Typically the filter must have rectangular wavelength response, with negligible loss in the passbands, and high rejection in the stopbands.

These properties are currently realized in two stages as in FIG. 1 where the first stage is a periodic slicer with maximally flat passbands. The slicer separates 2N input channels, centered at the wavelengths $$\lambda_1, \lambda_2, \lambda_3, \lambda_4, \ldots, \lambda_{2N-1}, \lambda_{2N}$$

into two interleaved sets, centered at $\lambda_1, \lambda_3, \ldots, \lambda_{2N-1}$ and $\lambda_2, \lambda_4, \ldots, \lambda_{2N}$, respectively including the even and odd wavelengths. Since the N wavelengths of either set are widely spaced (by twice the input channel spacing) they can be easily separated by a conventional waveguide grating router (which will be simply called a grating). Advantages of this technique are 1) reduced crosstalk between even and odd channels (since two stages of filtering are involved) and 2) reduced loss variation in each passband. The first property is particularly important since it reduces a major source of crosstalk, namely between adjacent channels $\lambda_j$ and $\lambda_{j-1}$. The second property is obtained because the passbands in the first stage are maximally flat and, in the second stage, they are widely spaced. Note, however, the complete arrangement is not characterized by maximally flat passbands.

In the above arrangement, the loss variation in the vicinity of each wavelength of maximum transmission is primarily caused, in each output router, by the wavelength dependence of each output image produced by the grating. Because of this wavelength dependence, each output image is generally displaced from the intended output waveguide location. This displacement is the primary cause for the above loss variation, and it can be essentially eliminated by using a planar arrangement of two gratings of opposite dispersions as shown previously in U.S. Pat. No. 5,488,680, which issued on January 1996, and U.S. Pat. No. 7,003,198 B2, which issued on February 2006. This technique is illustrated in FIG. 2, showing schematically a planar arrangement of two waveguide grating routers 201 and 202 and a waveguide lens 203 connected between the two gratings. In this arrangement, an input signal of variable wavelength applied to the input waveguide 204 is transformed by the first router 201 into a variable image $B_1$ (206) produced inside the principal zone $P_1P_2$ of the router. Thus, if the image 206 is produced inside the lens aperture, it is transferred efficiently by the lens to the second router 202, which in turn produces an output image $B_3$ (209), whose wavelength dependence is primarily determined by the dispersion coefficients of the two gratings producing $B_3$. Here, since the two gratings have opposite dispersions, the image $B_3$ is essentially stationary, and it can be received efficiently by an output waveguide 210 located at the (stationary) image location. This arrangement, therefore, has substantially reduced loss variation in the vicinity of each wavelength of maximum transmission, thus featuring to a good approximation maximally flat passbands.

A disadvantage of the technique of FIG. 2 is the large size of each grating as compared to a conventional grating. On the other hand, the increased size (the increased number of arms in each grating) can be shown to result in lower crosstalk. By using this technique, an efficient 1×N router with low values of loss and crosstalk has been realized by including between the two waveguide grating routers N lenses respectively producing N stationary images at the locations of the N output waveguides. Notice only one of the N lenses is shown in FIG. 2.

In the present application an efficient 1×N router is realized by a simpler technique, which makes use of the cyclic behavior of $B_1$ in the principal zone $P_1P_2$ of the input grating. As shown in FIG. 3, now only one lens 303 is used between the two gratings 301 and 302. The lens aperture now essentially covers the entire principal zone $P_1P_2$ (indicated as 307) of the input grating, and therefore now each cycle of $B_1$ 306 produces one stationary image $B_3$ 309, and N cycles are needed in order to produce N stationary images. The new arrangement is simpler to realize, since it includes only one lens, and the size of the input grating is now substantially reduced. On the other hand, since the lens aperture now essentially covers the entire principal zone 307, a full cycle of the image 306 is transmitted to each output waveguide. Therefore, in order to obtain a maximally flat response in the output waveguide (only one output waveguide 310 is shown) the efficiency variation of the first grating must be minimized over a substantial part of the principal zone 307.

In order to optimize the efficiency of the arrangement in FIG. 3, one must optimize the efficiencies of the two gratings and the lens. In each case the grating (or the lens) is formed between two periodic arrays (of radial waveguides) which determine the input and output efficiency of the grating or the lens. Therefore the complete arrangement includes a total of six periodic arrays. The total efficiency is the product of six efficiencies, each contributed by a particular array, and it is important to minimize the total loss by including in each array suitable segmented matching transitions as disclosed in U.S. Pat. No. 7,068,888 B1, which issued on Jun. 27, 2006. Consider for instance the efficiency of power transfer from the first grating to the lens. In this case one must optimize the arrangement of FIG. 4, consisting of two periodic arrays (each including two matching sections) separated by a slab region. Once the efficiency is optimized, one finds that the waveguides of each array are strongly coupled and therefore, in accordance with U.S. Pat. No. 5,136,671, which issued on Aug. 4, 1992, the phase center of each array is displaced from the edge of the slab. One also finds that aberrations are minimized by letting the phase center of each array coincide with the focal point of the radial waveguides of the other array. Residual aberrations are then small, and can be substantially eliminated by including suitable corrections in the waveguides of the lens and the grating (connected to the arrangement of FIG. 4).

Similar considerations apply to the other periodic arrays. Also notice that an important design requirement is that the total transmission loss must be about the same for all output waveguides. Therefore, since the loss variation in this case is caused by the output array of the output router, it is important to optimize this array. In this case, since the output array has a long focal lens, excellent performance can be realized by using (in addition to suitable matching sections) the technique described in U.S. Pat. No. 6,873,766 B2, which issued on Mar. 29, 2005. The array loss will then be typically negligible over at least 80% of the array central zone (thus insuring excellent uniformity for the loss of different output waveguides). In the following drawings, all matching sections will be omitted for simplicity, and the drawings will be further simplified by omitting in each case the phase center displacement.

To summarize, the arrangement of FIG. 1 is difficult to realize in integrated form, and it is afflicted by substantial loss variation in each passband. This variation is substantially eliminated by using the planar arrangement of FIG. 3, which can be realized in integrated form on a single wafer, and it is simpler than the prior art arrangement (obtained by including N lenses in FIG. 2) since the new arrangement requires only one lens between the two gratings, and the size of the input grating is substantially reduced. An additional advantage of the arrangement of FIG. 3 is that crosstalk can now be further reduced by including two gratings in the output stage as shown in FIG. 5. As shown in FIG. 5, the new arrangement is similar to FIG. 1, except that 1) the first stage is now realized by using a grating and 2) a composite lens is now used between the two stages. The two stages are again characterized (as in FIG. 2) by opposite dispersions and, therefore, they perform stationary imaging. In the arrangements of FIGS. 3, 5 one finds that the loss variation in each passband is primarily determined by the output efficiency of the first grating and therefore, by including suitable matching sections at the output of the first grating, the arrangement is (approximately) characterized by maximally flat response in each passband. Moreover, in both arrangements, adjacent channels crosstalk is substantially reduced, as compared to a conventional waveguide grating router.

SUMMARY OF THE INVENTION

The present invention, an improved optical filter using stationary imaging, provides reduced crosstalk and improved efficiency by using a novel planar arrangement suitable for realization in integrated form. The filter is a combination of two stages. In one embodiment, the input stage is a small waveguide grating router, and the output stage includes two larger waveguide grating routers, connected to the input router by a composite waveguide lens. The lens is essentially a combination of two lenses, which are joined together on the input side, where the composite lens essentially covers the entire principal zone of the input grating. The two stages are (essentially) characterized by opposite dispersions. Therefore, the wavelength response of the filter to an input signal of variable wavelength is a set of stationary images whose output locations alternate between the two output routers. Each stationary image is produced by a particular cycle of the input router. Therefore this arrangement can be used to separate efficiently a set of input channels spaced by the cycle width (the free-spectral range $\lambda_{free}$) of the input router. The composite lens separates the input channels in two sets, each having twice the input channel spacing. Each set is transferred by the waveguide lens to one of the two output routers. The waveguide lens is formed between three periodic arrays, respectively connected to the principal zones of the three gratings. One array (the input array of the lens) substantially covers the entire principal zone of the input grating, whereas each output array only covers a fraction (less than 1/N where N is the number of output waveguide for each output router) of the principal zone of each output router.

The entire arrangement, shown in FIG. 5, can be realized in integrated form on a single wafer and it features low values of loss and crosstalk. It consists of an input stage 501, an output stage 502, and a composite lens 503 placed between the two stages. The input stage 501 is a small waveguide grating router whose output focal circle 512 is characterized by a central zone 521 of minimal loss variation caused by the router efficiency variation. The composite lens 503 is a waveguide arrangement characterized by a single input aperture 521 and two separate output apertures (522 and 523), wherein the input aperture covers said zone 521 of minimal loss variation. Notice the aperture 521 in FIG. 5 exactly covers the principal zone 507, but it may be convenient to choose 521 somewhat smaller than 507 to reduce adjacent channel crosstalk. The output stage 502 consists of two waveguide grating routers, each connected to one of the two output apertures of the lens. The input grating and the output gratings have opposite dispersions, and therefore the wavelength response to an input signal applied to the input router is essentially two sets of stationary images located respectively on the two output circles 514 and 516 of the output stage. The output efficiency of the input grating is optimized by including in the output periodic array of the grating suitable matching sections 435 so as to essentially produce maximally flat response in each output waveguide of the arrangement.

In another embodiment, the second stage includes only one waveguide grating router and the composite lens is replaced by a lens with a single output aperture, and several channels spaced by the free-spectral range of the output stage are transmitted to each output waveguide.

DETAILED DESCRIPTION OF VARIOUS ILLUSTRATIVE EMBODIMENTS

In the following description, identical element designations in different figures represent identical elements. Additionally in the element designations, the first digit refers to the figure in which that element is first located (e.g., 201 is first located in FIG. 2).

Router Description

An important function that must be provided in high quality optical networks is that of wavelength multiplexing and demultiplexing. In particular, channel adding/dropping filters are needed at each node to combine and separate different wavelength channels. Typically the filter must have rectangular wavelength response, with negligible loss in the passbands, and high rejection in the stopbands.

These properties are currently realized in two stages, by first dividing the input channels $$\lambda_1, \lambda_2, \lambda_3, \lambda_4, \ldots, \lambda_{2N-1}, \lambda_{2N}$$

in two separate sets $\lambda_1, \lambda_3, \ldots, \lambda_{2N-1}$ and $\lambda_2, \lambda_4, \ldots, \lambda_{2N}$, respectively including the even and odd channels. Then, in the second stage, the N channels of each set are separated by using a conventional router. Advantages of this technique are that 1) crosstalk between even and odd channels is substantially reduced and 2) the passband variation is also reduced. The first property is a direct consequence of using two stages of filtering, and it is important because it reduces crosstalk between each j-th channel $\lambda_j$ and the adjacent channels $\lambda_{j\pm1}$. The second property can be explained as follows. The first stage is approximately characterized by maximally flat passbands and, therefore, the passband variation is primarily caused by the second stage. Moreover, for the second stage, the channel spacing $\lambda_j-\lambda_{j-2}$ is twice the input channel spacing $\lambda_j-\lambda_{j-1}$ and this will reduce, by about a factor of four in dB, the passband variation caused by the second stage. However, in spite of this reduction, appreciable loss variation remains in the passband.

Figure 1:
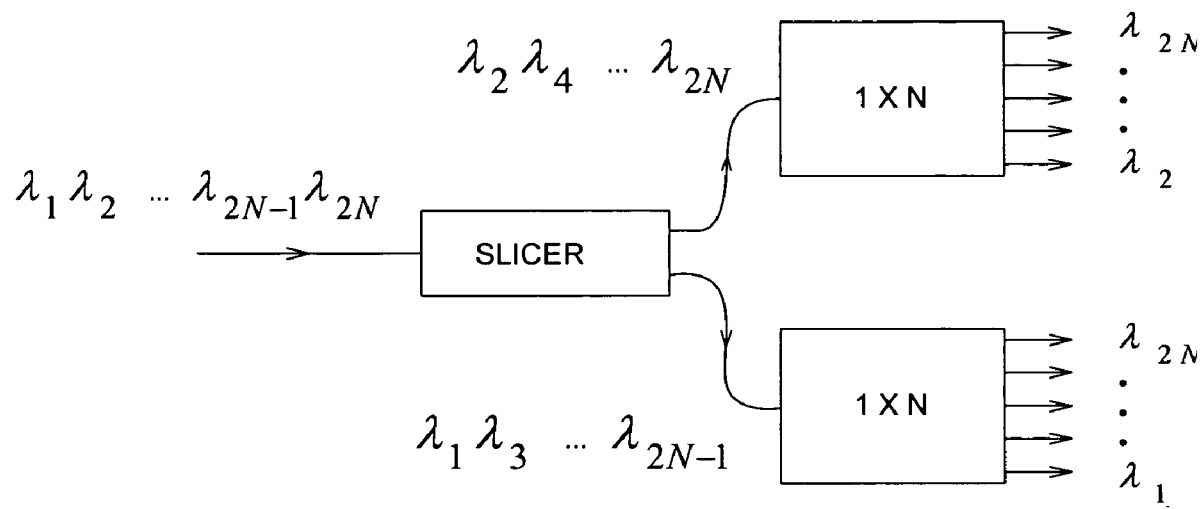
FIG. 1 illustrates the basic prior art form of a wavelength router consisting of a slicer combined with two waveguide grating routers.
Figure 2:
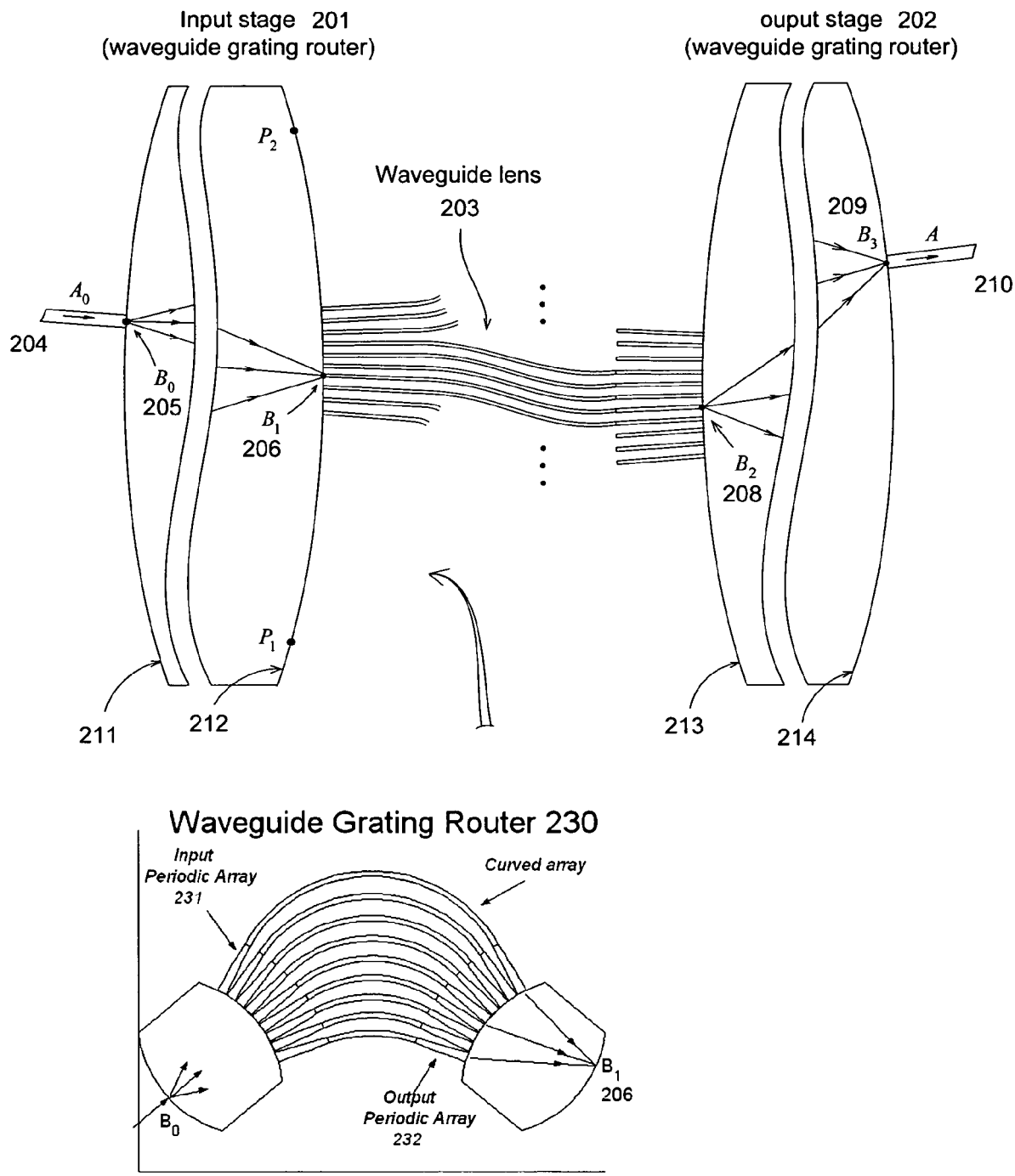
FIG. 2 shows a prior art arrangement performing stationary imaging by using two waveguide grating routers of opposite dispersions combined with a lens of small aperture.
Figure 3:
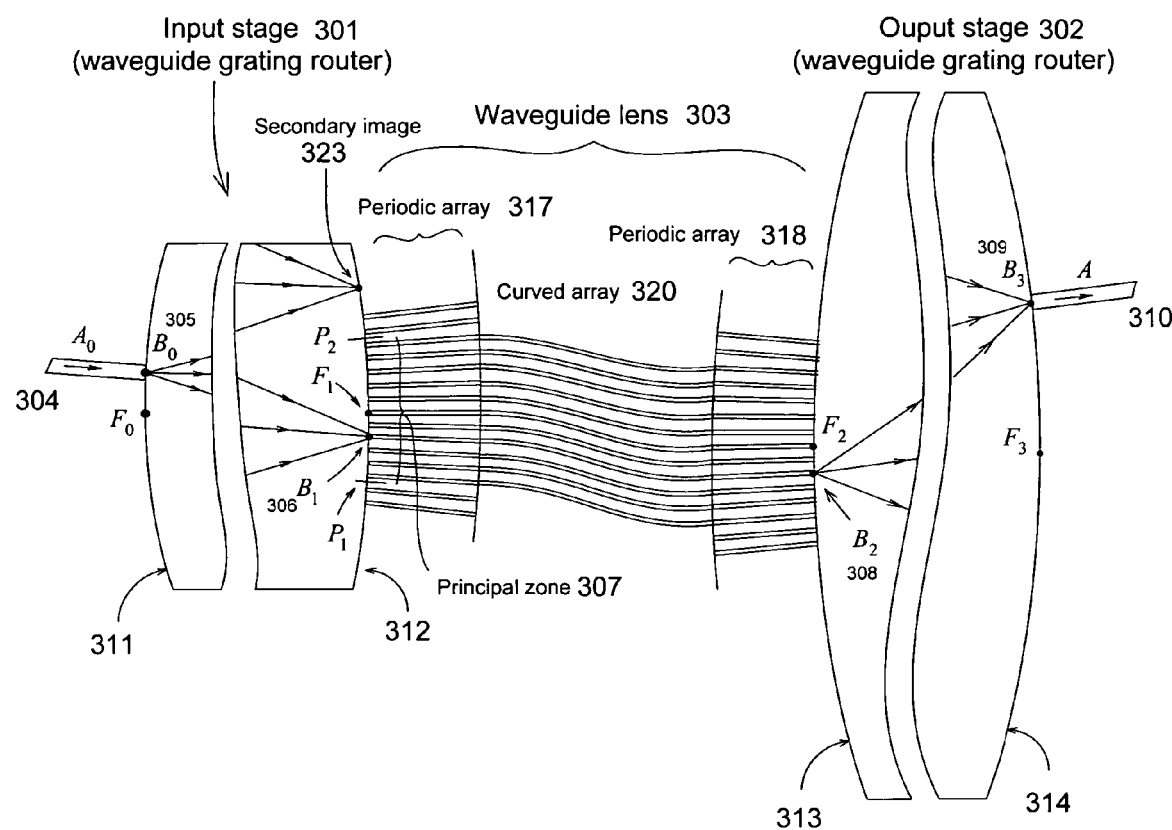
FIG. 3 shows an imaging arrangement consisting of two waveguide grating routers producing a stationary image in each cycle of the first router.
Figure 4:
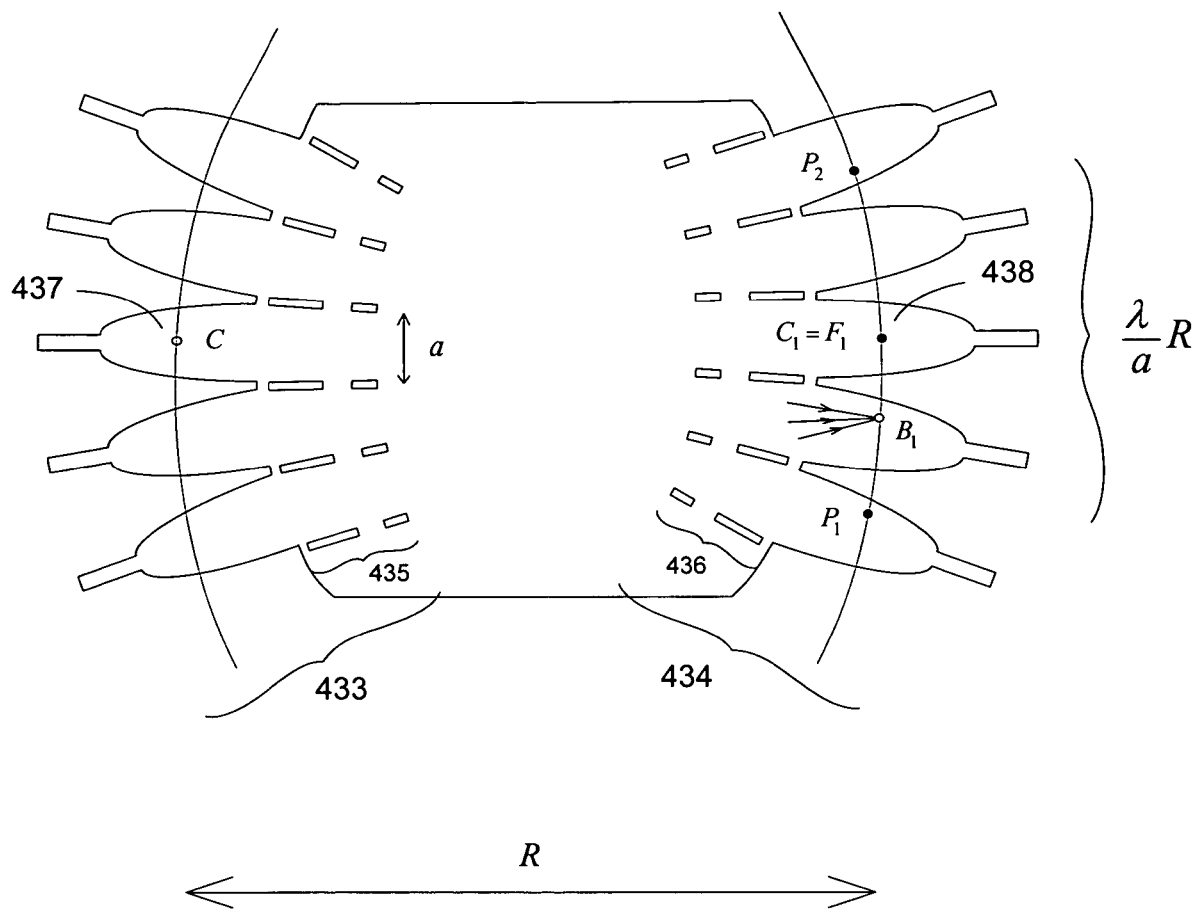
FIG. 4 shows a prior art confocal arrangement of two periodic arrays whose transitions 433 and 434 are optimized by including in each transition suitable segmented matching sections (435 and 436). To simplify the drawing each array only includes five elements and each transition only includes two matching sections. In practice, the actual numbers are typically much larger.

In this application the above loss variation is substantially reduced by using a different arrangement, which also reduces crosstalk and can be realized in integrated form on a single wafer. The new arrangement consists of two stages characterized by opposite dispersions, and it simpler than the previous arrangement described in U.S. Pat. No. 7,003,198 B2, which issued on February 2006. As shown in FIG. 3 the new arrangement requires a single lens, whose aperture now covers the entire central zone of the input grating, which is now much smaller than the output grating. Moreover, crosstalk can be substantially reduced by including in the output stage an additional grating as in FIG. 5. Both arrangements feature reduced loss and crosstalk. The former arrangement is simpler, while the latter arrangement is advantageous when further reduction in crosstalk is required. In both cases each router performs cyclic imaging as discussed in Dragone, C. "Theory of Wavelength Multiplexing with Rectangular Transfer Functions", IEEE Journal of Selected Topics in Quantum Electronics, Vol. 8, No. 6, pp. 1168-1178, November. 2002. Notice, as pointed out earlier, the arrangement of FIG. 5 performs two stages of filtering similarly to FIG. 1. This technique, realized here by modifying FIG. 3, is only possible if the N lenses of the prior art arrangement of FIG. 2 are replaced by a single lens essentially covering the entire central zone of the input grating as shown in FIG. 3.

Figure 5:
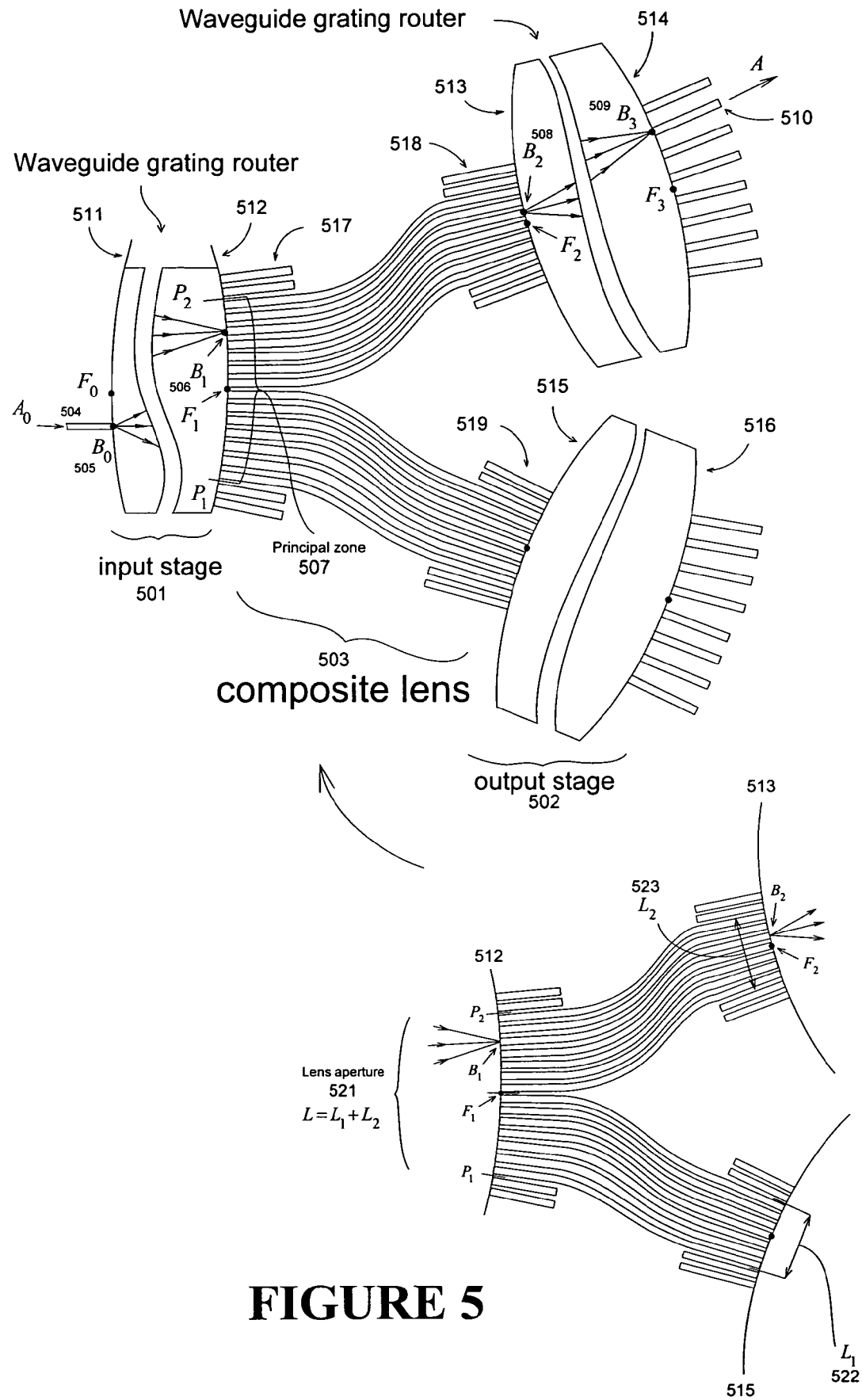
FIG. 5 shows an imaging arrangement consisting of an input waveguide grating router combined with two output waveguide grating routers. Each cycle of the input router is split in two by a composite lens, and the arrangement produces, in each half cycle, a stationary image $B_3$ on the output circle of one of the two output routers.

First consider the arrangement of FIG. 5, consisting of three waveguide grating routers. Each router performs imaging between the input and output focal circles through the focal points of the router. For instance, the first (smaller) router performs imaging between the two focal circles 511 and 512 through the foci $F_0$ and $F_1$, and similarly for the other (larger) routers (with focal circles 513,514,515 and 516). In this arrangement, an input signal $A_0$ of variable wavelength applied to the input waveguide 504 is transformed by the first router into a variable image 506 located in the principal zone $P_1P_2$ of the output focal circle 512 of the router. The image location $B_1$ varies cyclically in the principal zone. Each cycle starts from the edge $P_1$ and ends at the other edge $P_2$. The image then jumps from $P_2$ back to $P_1$, thus starting a new cycle. As shown in FIG. 5 the principal zone of the first router is connected to the input focal circles 513 and 515 of the other two routers through a composite lens 503 which consists of two distinct sets of waveguides, respectively connected to the two routers. The lens includes three periodic arrays 517, 518 and 519, respectively connected to the three routers, and it substantially provides equal paths within each set corresponding to one of the two output routers. Thus, for instance, if the image $B_1$ is produced inside the aperture $L_2$ 523 of the top set, then it is transferred to the principal zone of the top router, which then produces in the output zone of the router an image $B_3$509 whose wavelength dependence is determined by the sum of the dispersion coefficients of the two gratings producing $B_3$. Thus, by properly designing the two gratings, so that they essentially produce opposite dispersions, a stationary image $B_3$ is produced, thus allowing the image to be received efficiently by an output waveguide located at the (stationary) image location. The same result is obtained when the image $B_1$ is produced inside the bottom aperture $L_1$522 of the lens. Moreover, since the location of $B_1$ alternates between the two apertures $L_1$ and $L_2$, each cycle of $B_1$ produces two stationary images, respectively produced by the two output routers. Here each cycle of either output router will be assumed to include a large number of cycles of the input router. Then, in each output cycle, a relatively large number of stationary images will be produced. Here this number can be appreciably larger than N, and a 1×2N router is designed by including in each of the two output routers N output waveguides.

Imaging Efficiency and Crosstalk

Next consider the arrangement of FIG. 3, consisting of two gratings 301 and 302 and an ordinary lens 303 connected between the two gratings. Each grating performs imaging between two focal circles (311, 312 or 313, 314) respectively containing the focal points ($F_0$, $F_1$ or $F_2$, $F_3$) of the grating. Therefore the complete arrangement includes a total of four focal points $$F_0, F_1, F_2, F_3$$

By applying, in the vicinity of $F_0$, an input signal $B_0$ 305 of variable wavelength, $B_0$ is transformed by the first grating into a variable image $B_1$ 306 produced on the focal circle 312 of the first grating. This image is then transformed by the lens into a second image $B_2$ 308 produced on the focal circle 313 of the second grating. Finally, the second grating produces an output image B₃ 309 produced on the focal circle 314. Notice, here we are assuming that the two gratings have opposite dispersions. Without this condition, the output image location $B_3$ would vary with the wavelength, and this variation would be the sum of the variations caused by the two gratings. Here, by using two grating of opposite dispersions, the two variations cancel each other. Then the output image $B_3$ is stationary, and a maximally flat passband can be realized as discussed later.

As discussed in [Dragone, C. "Theory of Wavelength Multiplexing with Rectangular Transfer Functions", IEEE Journal of Selected Topics in Quantum Electronics, Vol. 8, No. 6, pp. 1168-1178, November 2002] a property of each grating in the above arrangement is that each image produced in the principal zone of the grating is accompanied by secondary images (for instance 323) produced outside the principal zone (FIG. 3). These images are equally spaced, and their spacing is equal to the width of the principal zone, which is centered at the focal point $F_1$. Here the only important image is the principal image produced inside the principal zone. This is the image of highest intensity. All other (secondary) images produced outside the principal zone are undesirable, for they reduce the output power transferred to the principal image 306. Each image is produced by a particular diffraction order of the grating, and its location is characterized by a continuous (monotonic) variation as a function of the wavelength. The principal image 306 is instead characterized by cyclic variation as a function of the wavelength. Each cycle is produced by a particular order. A cycle starts when a secondary image (of a particular order) enters the principal zone, thus becoming the principal image, and the cycle ends when the image exits the principal zone, thus becoming again a secondary image. Notice the entrance and exit points in FIG. 3 are the edges $P_1$ and $P_2$ of the zone. The principal image variation is clearly discontinuous. At the end of each cycle, the image jumps discontinuously from $P_1$ to $P_2$ and, at the same time, the order increases by one. The above considerations apply to both gratings, and the wavelength width $\lambda_{free}$ of each cycle is called the free-spectral range of the grating.

As shown in FIG. 2, each grating 230 consists of three parts, respectively a periodic radial array, followed by an arrangement of curved waveguides, followed again by a periodic radial array. In FIG. 3 the focal points $F_0, F_1, F_2, F_3$ are simply the focal points of the above periodic arrays and, on each focal circle, the width of the principal zone is determined by the corresponding array period. Each grating performs imaging between its input and output focal circles. Thus, at a particular wavelength, an input point source is transformed by the grating into a corresponding principal image, and the image intensity is determined by the grating efficiency, which is the product of the input and output efficiencies, respectively determined by the input and output periodic arrays of the grating. For instance, in FIGS. 3, 5 the efficiency of the first grating is $\eta_0\eta_1$ where $\eta_0$ is the efficiency of power transfer from $B_0$ to the first periodic array (shown as 231 in FIG. 2) and $\eta_1$ is the efficiency of power transfer from the second periodic array (shown as 232 in FIG. 2) to the image $B_1$. Note the input efficiency is a function $\eta_0(B_0)$ of the location $B_0$ on the input circle, and similarly the output efficiency $\eta_1(B_1)$ is a function of the output location $B_1$. "This function, specifying the efficiency behavior of a periodic array as a function of the focal circle image location ($B_0$ or $B_1$), will be called here the array efficiency".

The output efficiency of the input grating is simply the fraction of the output power that is transferred to the principal image 306 or 506 and, therefore, it can be substantially improved by reducing the power transferred to secondary images. To this purpose one must include in the output periodic array 232 suitable segmented matching transitions as shown in U.S. Pat. No. 7,068,888 B1, which issued on Jun. 27, 2006. Moreover, since the device is reciprocal, the same technique applies to the input periodic array 231, whose efficiency is again substantially improved by including suitable matching transitions. The same technique also improves the input and output efficiencies of the lens, which is discussed later. Without matching transitions, the efficiency in the principal zone would typically vary between about 0.8 at the center and ½ at the edges. On the other hand, by using suitable transitions, this variation is substantially reduced. The residual loss is typically very small, a few tenths of dB, over more than 50% of the principal zone. Here these transitions play an important role for two reasons. First, since each signal traverses (in FIGS. 3 and 5) a total of 6 periodic arrays, it is important to minimize the total loss by including matching transitions in each array. Second, as explained later, the loss variation in each passband is primarily caused by the output efficiency variation of the first grating. Therefore, in order to realize a maximally flat response, suitable matching transitions must be included in the output periodic array of the first grating.

The lens in FIG. 3 is located between the focal circles 312 and 313 of the two gratings, and it transforms the image $B_1$ into an output image $B_2$ located on the second focal circle 313. On the first circle, the lens aperture is centered at $F_1$, and it essentially covers the entire principal zone of the first grating. On the second circle, the lens is again centered at the focal point, but in this case the lens aperture only covers a small fraction of the principal zone of the second grating. The lens again consists of three parts, namely an input periodic array, a curved array, and an output periodic array. The efficiency $\eta_L$ in this case is the product of three efficiencies, namely the input and output efficiencies and the truncation efficiency. The input and output efficiencies are independent of the image location. The truncation efficiency is unity everywhere inside the lens aperture, except in the vicinity of either edge, where truncation by the lens aperture causes the efficiency to gradually decrease. The width of this decrease is equal to the image width and the truncation efficiency at the edge is about ½. In the following, the image width $W_f$ is assumed to be much smaller than the width of the lens aperture. Notice similar considerations apply to FIG. 5.

Next, consider a particular cycle (order) of the first grating, and determine the efficiency $\eta$ of power transfer to a matched waveguide 510 located in FIG. 5 at a stationary location $B_3$ of the output image 509. Ignore for simplicity material losses. Also ignore for the moment truncation losses by the finite apertures of the two gratings, since these losses are small, and they are wavelength independent to a good approximation. Under these conditions the total efficiency $\eta$ is simply the product of the individual efficiencies and, since each efficiency is a function of the image location in the principal zone, $$\eta = \eta_0(B_0) \cdot \eta_1(B_1) \cdot \eta_L(B_1) \cdot \eta_2(B_2) \cdot \eta_3(B_3)$$

where $\eta_0$, $\eta_1$ are the input and output efficiencies of the first grating, and similarly $\eta_2$, $\eta_3$ are the efficiencies of the output grating. Notice, since $B_0$, $B_3$ are stationary, the efficiency variation is entirely caused by the variations of $\eta_1(B_1)$, $\eta_L(B_1)$ and $\eta_2(B_2)$. Of these variations, the most important one is the first. The last variation, caused by the output grating, is small since $B_2$ is produced inside the lens aperture, which is assumed to be much smaller than the principal zone of the output grating. The second variation, caused by truncation by the lens, can be ignored if the image width is small enough. The most important variation, therefore, is caused by the input grating 501. In this case the image $B_1$ describes a full cycle $P_1P_2$ of the grating in each passband. Therefore, in order to obtain a maximally flat response, the output efficiency variation $\eta_1(B_1)$ of the input grating must be fully minimized, by using suitable matching sections as in U.S. Pat. No. 7,068,888 B1, which issued on Jun. 27, 2006.

Notice one would like the efficiency of the input grating to be very nearly constant over a large portion (more than 50%) of the principal zone $P_1P_2$, since this will correspondingly minimize the loss variation over a large portion of each passband. To realize this result, suitable matching sections must be included in the output periodic array of the grating, as stated earlier. Here, since the grating (the number of arms) is typically small, one can show that the above result would be difficult to realize by using conventional segmentation as shown in U.S. Pat. No 5,745,618, which issued on Apr. 28, 1998.

Once the efficiency is optimized, the input signal can be transmitted efficiently, in each cycle of the input grating, to an output waveguide 310 placed at the stationary location $B_3$ as shown in FIG. 3. Moreover, by including suitable matching sections, a maximally flat passband is realized over a large portion of the cycle of the first router. As pointed out earlier, each cycle of $B_1$ starts from the first edge $P_1$ of the principal zone and it ends at the other edge $P_2$ with a jump back to $P_1$. Therefore, at the end of the cycle, the output image produced by the output grating jumps from $B_3$ to a new stationary location, and so on from each cycle to the next. The arrangement therefore produces a set of output images whose spacing is determined by the principal zone width at the output of the input grating 301. Therefore, by properly designing the second grating 302, so that its cycle includes at least N cycles of the first grating, a set of at least N stationary images will be produced by each order (each cycle) of the second grating. Notice one would like in general the output images to be produced with about the same efficiency. Therefore, since the difference in efficiency at different output locations is determined by the efficiency variation of the output periodic array (denoted as 232 in FIG. 2) of the output grating, it is important to fully optimize this array. In this case, the output array is characterized by a long focal length and therefore its efficiency is best optimized by a combination of the two techniques described in U.S. Pat. No. 6,873,766, which issued on Mar. 2, 2005 and U.S. Pat. No. 7,068,888 B1, which issued on Jun. 27, 2006.

Similar considerations apply to FIG. 5, except that now the output stage includes two gratings (each characterized by dispersion opposite to the input grating). The lens 503 is now a composite lens, with two output apertures 522 and 523, each centered at the first focal point of one of the two output gratings. The input aperture of the lens again covers essentially the entire principal zone of the input grating. Now however the lens is effectively a combination of 2 lenses, each essentially covering half of the principal zone of the input grating. Thus, each cycle of $B_1$ is now effectively divided into 2 segments $L_1$ and $L_2$ respectively corresponding to the two output apertures 522 and 523 by the lens. The width W of each segment covers half of the principal zone width. Whenever the image $B_1$ is produced inside one of the two segments, it is efficiently transferred by the lens to one of the two output gratings. Therefore the output image $B_2$ alternates between the principal zones of the two output gratings. Again each output aperture only covers a (small) fraction of the principal zone of the output grating. As in the previous arrangement, each output grating again produces a set of at least N stationary images. The lens consists of three parts, namely an input periodic array 517, an arrangement of two curved arrays, and an arrangement of two output periodic arrays 518 and 519, each connected to the principal zone of a particular output grating.

Wavelength Response

Figure 6:
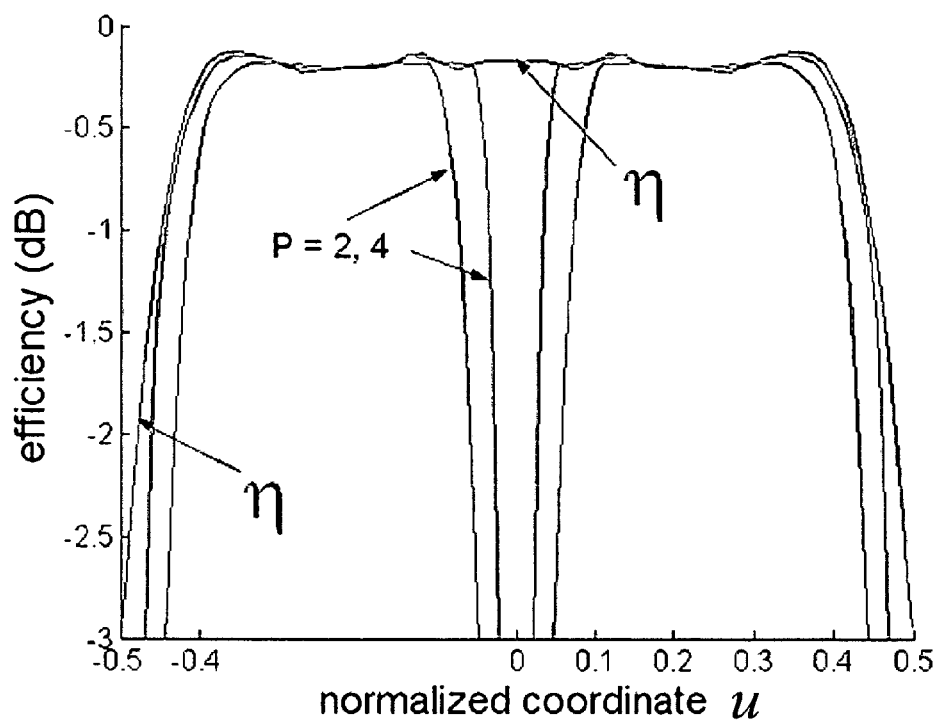
FIG. 6 shows the efficiency variation caused by the first stage in FIG. 5. The three curves show respectively the efficiency of the first grating and the passbands for P=2, 4.

Consider in FIG. 5 the wavelength response produced, in a particular passband, by an input signal of unit amplitude $A_0$. The input signal produces, over the lens aperture, an image $B_1$, which is then transformed by the second grating into an output signal of amplitude A produced in the output waveguide. The output amplitude A is best determined, according to a well known reciprocity theorem, by reversing the sense of transmission, and applying the input signal to the output waveguide. This will produce over the appropriate lens aperture $L_1$ or $L_2$ a second image, and the coupling coefficient between the two images is equal in magnitude to the output signal amplitude A. Notice the coupling coefficient is simply the overlap integral of the two images. By using ideal gratings (with unity efficiencies) and ignoring truncation by the lens aperture, both images would have unity amplitude, and the overlap integral would simply give $|A|=1$. The actual coupling coefficient is obtained by including, in the above integral, the appropriate aperture function of the arrangement, namely the square root of $\eta(u)$, truncated by a rectangular function representing the appropriate lens aperture $L_1$ or $L_2$. One then obtains $$A(u_0) \approx \int_{L_i} f(u - u_0)\sqrt{\eta(u)}\, rect_{L_i} du,$$

$$(i = 1 \text{ or } 2)$$

where the integral is actually a sum of the contributions from the various elements of the lens. In the above expression the sum is calculated inside the appropriate lens aperture, $\eta(u)$ is the total efficiency (the product of the efficiencies of the two gratings) expressed as a function of the coordinate over the lens aperture, $f(u)$ is the image power density that would be produced by ideal gratings with unity efficiency, and $u_0$ represents the image location (which is a function of the wavelength). As pointed out earlier, here $\eta(u)$ is approximately equal to the output efficiency of the first grating, and it is improved here by suitable matching transitions as shown in U.S. Pat. No. 7,068,888, which issued on Jun. 27, 2006. The improvement can be shown to depend on the output focal length R of the grating, and an example calculated for R=3000, μm is shown in FIG. 6. Also shown are the transfer functions obtained, for the even and odd channels, for two different values of the ratio $P=W/W_f$ between the width W of each aperture $L_1$ or $L_2$ and the full width $W_f$ of $f(u)$. Notice here the value of 2W determines the spacing of the output waveguides whereas, in a conventional arrangement, the spacing would be determined by the width $W_f$ of $f(u)$. Therefore here the spacing is increased by a factor 2P, as compared to a conventional design. As a consequence, the size of the output router (the number of arms) in FIG. 5 is increased by a factor 2P, as compared to a conventional router. Here a large 2P is desirable for several reasons. One reason is that a large 2P substantially improves the response behavior in the regions close to the edges of the lens aperture, thus causing the response to approach the truncated efficiency $\eta(u) \, \text{rect}_{L_i}$ as shown in FIG. 6 for P=4.

A large 2P also reduces crosstalk for the following reason. In a conventional router, the width of each image is approximately equal to the width of each output waveguide. Moreover, typically, the output waveguides are closely spaced, and substantial crosstalk is then produced between adjacent waveguides. On the other hand, here the spacing of adjacent waveguides is increased by a factor 2P, and the above crosstalk is then substantially reduced. Notice, a large 2P is also expected to reduce crosstalk caused by random phase errors. The above considerations apply to both arrangements of FIGS. 3 and 5. The former arrangement is simpler to realize, but the latter arrangement has the advantage of substantially reducing crosstalk between even and odd channels, since in the latter case two stages of filtering are applied to the input channels. Notice, however, both arrangements substantially reduce adjacent channel crosstalk.

Notice the interval $0 \leq |u| \leq 0.5$ in FIG. 6 represents the principal zone of the input stage. One can see that the efficiency $\eta$ in FIG. 6 is very nearly constant over about 80% of the central zone and, in this maximally flat region, the loss is very small, close to 0.1 dB. In this application, this entire central region of minimal loss variation is essentially covered by the input aperture of the lens, as shown for instance in FIG. 3 where the lens aperture actually covers the entire principal zone 307. According to FIG. 6 for P=4, each passband in the arrangement of FIG. 3 will then be characterized by a maximally flat region covering about 80% of the channel spacing. Similar considerations apply to FIG. 5, except that each cycle of the input router produces in this case two passbands. Notice a basic difference between the new arrangement and the prior art arrangement of U.S. Pat. No. 7,003,198 B2 is that each lens in the latter case only covers a relatively small fraction of the central zone of the input grating. Therefore, in the latter case, the input grating efficiency need not be optimized over a large fraction of the central zone as in FIG. 6.

Notice, the dispersion coefficients of the two routers in FIG. 3 are generally characterized by slightly different wavelength dependence. Therefore opposite dispersions can only be realized at a particular wavelength of the input signal. On the other hand, once the above condition is realized accurately at a particular input wavelength, then stationary imaging will also be realized to a good approximation (for most purposes of interest) at all other input wavelengths. So far consideration was restricted to only one cycle (a particular order) of the output stage. Next consider an additional cycle. In general, the new set of stationary output images produced by the new cycle will not overlap with the original set of images. In order for the two sets to accurately overlap, the width of the output central zone of the output stage must be an integer multiple of the spacing of the output waveguides. In other words, since the output waveguides spacing is determined by the central zone width of the input stage, each cycle of the output router must include an integer number of cycles of the input router. Notice this condition requires that each free-spectral range of the output stage must be an integer number N of free-spectral ranges $\lambda_{free}$ of the input stage. The significance of this condition can be understood as follows. Consider a particular stationary image $B_3$ produced at an input wavelength $\lambda_{center}$ corresponding to the center wavelength of a particular passband. Then the image $B_1$ is produced at the center $F_1$ of the principal zone 307. Moreover, consider the images produced at the wavelength $\lambda_{center} + N\lambda_{free}$. Since this wavelength is displaced from previous wavelength $\lambda_{center}$ by N free-spectral ranges $\lambda_{free}$ of the input router, the image $B_1$ is again produced at the previous location $F_1$, and therefore the new wavelength is again located at the center of a passband. Moreover, since $N\lambda_{free}$ is equal to the free-spectral range of the output stage, the output stationary image is again produced at the previous location $B_3$, and it is received efficiently by the same output waveguide.

The above condition is important for it substantially increases the total number of channels that can be efficiently transmitted to the output waveguides. Once the above condition is satisfied, the arrangement will approximately exhibit the following cyclic behavior. By including N output waveguides in FIG. 3, several consecutive cycles of the output router will accurately produce, at the locations of the N waveguides, several sets of stationary images. Indeed the arrangement will behave approximately as a periodic slicer which separates a set of input wavelengths, $$\ldots \lambda_i, \lambda_{i+1}, \lambda_{i+2} \ldots \lambda_{i+N}, \lambda_{i+1+N}, \lambda_{i+2+N} \ldots \lambda_{i+2N}, \lambda_{i+1+2N}, \lambda_{i+2+2N} \ldots,$$

characterized by channel spacing $\lambda_{free}$, into several sets $$\ldots \lambda_i, \lambda_{i+N}, \lambda_{i+2N} \ldots$$

$$\ldots \lambda_{i+}, \lambda_{i+1+N}, \lambda_{i+1+2N} \ldots$$

$$\ldots \lambda_{i+2}, \lambda_{i+2+N}, \lambda_{i+2+2N} \ldots$$

wherein each set is characterized by channel spacing N times larger than the input spacing, and each set is produced at a particular waveguide location. Notice $\lambda_i$ is a particular center wavelength.

Applications

Figure 7:
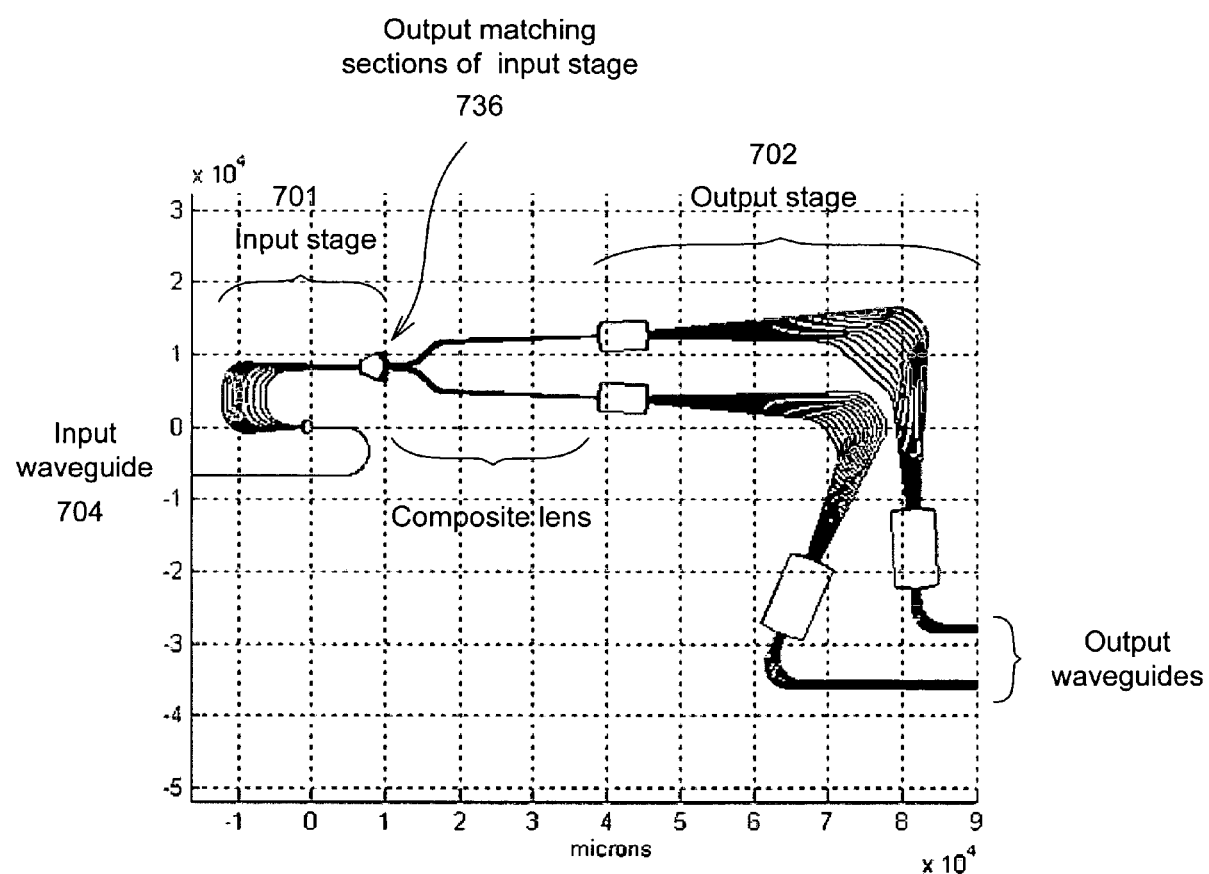
FIG. 7 shows the mask layout of a 1×8 wavelength router with channel spacing of 200 GHz.

The arrangement of FIG. 5 is attractive when stringent requirements are imposed on loss and crosstalk. It can be realized on a single wafer, and it features maximally flat passbands. As stated earlier, in order to accurately realize the above results, each output cycle (period) of each output router must include to a good approximation an integer number of input cycles. In order to satisfy this condition, it can be shown that the order of the input router must be substantially equal to an integer multiple of the output order. Moreover, since the input order is much greater than unity, it is sufficient to specify the above condition (that the input order must be an integer multiple of the output order) for only a particular stationary image, for instance for an image produced in the vicinity of the output focal point of the output router. Then, if the input order is large enough, the above condition will also be satisfied accurately for all other images of interest. Notice the above properties directly follow from the well known relationship between period (free-spectral range) and order of a grating. It is particularly attractive for use in a passive optical network, in which case large channel spacing is often required. FIG. 7 shows for instance a mask layout designed for an input channel spacing of 200 GHz and 2N=8. In this example, a relatively large value P=4 was chosen for the parameter P discussed earlier. A smaller value would reduce the overall size, but it would also increase loss and crosstalk as pointed out earlier. Dummy waveguides are not shown. In each grating, some of the intermediate arms are also omitted for clarity (only the top and bottom arms and some intermediate arms are shown).

As pointed out in this disclosure it is important to reduce crosstalk by using two stages of filtering as in FIG. 5. On the other hand, the arrangement of FIG. 3 is attractive for its simplicity if very stringent requirements are not imposed on crosstalk. Also notice here the lens input aperture was assumed to cover (approximately) the entire principal zone of the input grating. Clearly this restriction can be removed. In particular, the lens aperture in FIG. 3 may be advantageously chosen somewhat smaller than the principal zone to further reduce adjacent channels crosstalk. Here only one input waveguide was included but, more generally, several input waveguides may be included.

Notice the arrangements considered here can be generalized by including in the output stage Q output gratings, by using between the two stages a composite lens with Q output apertures. Here only the two special cases Q=1, 2 were considered, since they are particularly advantageous and cover most cases of interest.

What is claimed is:

1. A wavelength router formed by a planar optical imaging arrangement comprising an input stage, an output stage, and a composite lens connected between the two stages, wherein:

the input stage is a waveguide grating router whose output focal circle is characterized by a central zone of minimal loss variation caused by the router efficiency variation;

the composite lens is a waveguide arrangement characterized by a single input aperture and two separate output apertures, wherein the input aperture covers said zone of minimal loss variation;

the output stage includes two waveguide grating routers, each connected to one of the two output apertures of the lens;

the input grating and the output gratings have substantially opposite dispersions, so that the wavelength response to an input signal applied to the input router is essentially two sets of stationary images, respectively produced on the two focal circles of the two output routers, wherein the images of each set are produced by different diffraction orders of the input router; and, each output router includes several output waveguides, each connected at the location of one of said stationary images.

2. The planar optical imaging arrangement as recited in claim 1 wherein the output efficiency of the input waveguide grating router is optimized by including in the output periodic array of the grating a segmented arrangement of several matching sections so that an essentially flat response is produced by each stationary image.

3. The planar optical imaging arrangement as recited in claim 1 wherein the input router diffraction order for a particular stationary image located in the vicinity of the output focal point of one of the two output routers is chosen essentially equal to an integer multiple of the output router diffraction order for that image.

4. A wavelength router formed by a planar optical imaging arrangement comprising an input waveguide grating router, an output waveguide grating router, and a lens formed between the two waveguide grating routers, wherein:

the output focal circle of the input waveguide grating router is characterized by a central zone of minimal loss variation caused by the router efficiency variation;

the lens is a waveguide arrangement whose input aperture covers said zone of minimal loss variation, and the lens output aperture is connected to the input focal circle of the output waveguide grating router;

the waveguide grating routers have opposite dispersions, so that the wavelength response to an input signal applied to the input router is essentially a set of stationary images produced on the output circle of the output router;

said images are produced by different diffraction orders of the input router;

the output router includes several output waveguides, each connected at the location of one of said stationary images; and, the output efficiency of the input waveguide gratinig router is optimized by including in the output periodic array of the grating a segmented arrangement of several matching sections so that an essentially flat response is produced by each stationary image.

5. The planar optical imaging arrangement as recited in claim 4 wherein the input router diffraction order for a particular stationary image located in the vicinity of the output focal point of the output router is chosen essentially equal to an integer multiple of the output diffraction order for that image.

* * * * *